US009668486B2

(12) United States Patent
Chiaramello

(10) Patent No.: US 9,668,486 B2
(45) Date of Patent: Jun. 6, 2017

(54) DOUGH KNEADER MACHINE AND RELATED METHOD OF MAKING AN ALIMENTARY DOUGH

(71) Applicant: Artech S.r.l., Cuneo CN (IT)

(72) Inventor: Antonio Chiaramello, Cuneo CN (IT)

(73) Assignee: Artech S.r.l., Cuneo CN (IT)

( * ) Notice: Subject to any disclaimer, the term of this patent is extended or adjusted under 35 U.S.C. 154(b) by 85 days.

(21) Appl. No.: 14/429,251

(22) PCT Filed: Sep. 20, 2012

(86) PCT No.: PCT/IT2012/000290
§ 371 (c)(1),
(2) Date: Mar. 18, 2015

(87) PCT Pub. No.: WO2014/045311
PCT Pub. Date: Mar. 27, 2014

(65) Prior Publication Data
US 2015/0216183 A1    Aug. 6, 2015

(51) Int. Cl.
*A21C 1/00* (2006.01)
*A21C 1/02* (2006.01)
(Continued)

(52) U.S. Cl.
CPC .............. *A21C 1/02* (2013.01); *A21C 1/006* (2013.01); *A21C 1/1425* (2013.01);
(Continued)

(58) Field of Classification Search
CPC ......... A21C 1/02; A21C 1/1425; A21C 1/006; A21C 1/1455; A21C 1/1435; B01F 7/18
(Continued)

(56) References Cited

U.S. PATENT DOCUMENTS

| 739,422 A | * | 9/1903 | Jones | ................... B01F 13/002 |
| | | | | 366/247 |
| 1,761,613 A | * | 6/1930 | Chrul | ..................... A23G 3/08 |
| | | | | 366/149 |

(Continued)

FOREIGN PATENT DOCUMENTS

| DE | 887195 | 8/1953 |
| EP | 0042681 | 12/1981 |

(Continued)

OTHER PUBLICATIONS

International Search Report issued in PCT Application No. PCT/IT2012/000290, dated May 6, 2013, 5pgs.

*Primary Examiner* — Tony G Soohoo
(74) *Attorney, Agent, or Firm* — Lucas & Mercanti, LLP

(57) ABSTRACT

The invention relates to a kneader machine for alimentary doughs including a container provided with a tight lid and a rotor rotatably arranged in the container about a vertical rotation axis (A), wherein the rotor has a flat base consisting of a plurality of arms and a plurality of mixing paddles which extend from the arms in a vertical direction (V), and wherein the arms of the rotor have beveled surfaces formed along their peripheries on the sides intended to face a rotation direction of rotation (R) of the rotor. The mixing paddles have first and second mixing paddles configured so as to generate between them a whirling motion of the particles of the solid ingredients on a plane (P) passing through the rotation axis (A) of the rotor and perpendicular to its base. The invention also relates to a method of making an alimentary dough by using the kneader machine.

6 Claims, 2 Drawing Sheets

(51) Int. Cl.
*A21C 1/14* (2006.01)
*B01F 7/00* (2006.01)
*B01F 7/16* (2006.01)
*B01F 7/18* (2006.01)

(52) U.S. Cl.
CPC .......... *A21C 1/1435* (2013.01); *A21C 1/1455* (2013.01); *B01F 7/00166* (2013.01); *B01F 7/00275* (2013.01); *B01F 7/162* (2013.01); *B01F 7/18* (2013.01); *B01F 2215/0011* (2013.01)

(58) Field of Classification Search
USPC ................ 366/279, 314, 325.4, 327.3, 327.4
See application file for complete search history.

(56) References Cited

U.S. PATENT DOCUMENTS

| | | | | | |
|---|---|---|---|---|---|
| 1,854,732 | A * | 4/1932 | Beran | ..................... | B01F 7/186 126/377.1 |
| 2,272,125 | A * | 2/1942 | Loone | ................. | B01F 7/00583 366/246 |
| 2,498,125 | A * | 2/1950 | Knudsen | ............... | B01F 7/0005 220/4.12 |
| 2,702,571 | A * | 2/1955 | Murray | ............... | A47J 43/0465 241/282.1 |
| 3,024,010 | A * | 3/1962 | Sperling | ................. | B01F 7/162 241/282.1 |
| 4,091,457 | A * | 5/1978 | Slywka | ................... | B01F 7/186 366/304 |
| 6,666,574 | B1 * | 12/2003 | Pryor | ................. | A47J 43/0722 241/282.1 |
| 7,641,380 | B2 * | 1/2010 | Behar | ................. | A47J 43/0722 241/282.1 |
| 8,056,848 | B1 * | 11/2011 | Liang | ................. | A47J 43/0722 241/282.2 |
| 8,690,093 | B2 * | 4/2014 | Rukavina | ............ | A47J 43/0722 241/282.2 |
| 8,950,930 | B2 * | 2/2015 | Wang | .................... | A47J 43/046 366/205 |
| 2001/0019515 | A1 * | 9/2001 | Schmidt | ............. | B01F 7/00208 366/310 |
| 2004/0081017 | A1 * | 4/2004 | Kongstad | ................. | A23G 1/18 366/314 |
| 2004/0213082 | A1 * | 10/2004 | Tobler | ..................... | F25C 5/007 366/325.4 |
| 2006/0219100 | A1 | 10/2006 | Gelfand | | |
| 2008/0198691 | A1 * | 8/2008 | Behar | ................. | A47J 43/0722 366/205 |
| 2012/0080549 | A1 * | 4/2012 | Rukavina | ............. | B01F 7/0025 241/282.1 |
| 2012/0314533 | A1 * | 12/2012 | Wang | .................... | A47J 43/046 366/292 |
| 2014/0321234 | A1 * | 10/2014 | White | ................. | B01F 7/00275 366/347 |
| 2015/0216183 | A1 * | 8/2015 | Chiaramello | ............ | A21C 1/02 426/504 |
| 2015/0250360 | A1 * | 9/2015 | Hyp | ...................... | A47J 43/046 366/205 |
| 2015/0259501 | A1 * | 9/2015 | Nakahara | ............... | B01D 1/225 521/45 |
| 2015/0272395 | A1 * | 10/2015 | Dahlback | ............ | A47J 43/0722 366/343 |

FOREIGN PATENT DOCUMENTS

| | | |
|---|---|---|
| GB | 190826 | 1/1923 |
| IT | MI2009A001318 | 1/2011 |

* cited by examiner

DOUGH KNEADER MACHINE AND RELATED METHOD OF MAKING AN ALIMENTARY DOUGH

CROSS-REFERENCE TO RELATED APPLICATIONS

This application is a 371 of PCT/IT2012/000290, filed Sep. 20, 2012.

FIELD OF THE INVENTION

The present invention relates to a dough kneader machine and to a method of making alimentary doughs, in particular doughs for bread and confectionery products.

BACKGROUND OF THE INVENTION

Known kneader machines for both domestic and industrial use, comprise a container, typically made of stainless steel, wherein a rotor rotatably restrained to a shaft of an electric motor is arranged, the rotor being provided with a plurality of mixing paddles.

In order to make an alimentary dough, a predefined amount of ingredients in a solid form, such as mixtures of flour and/or meals, is poured into the container and continuously mixed by rotating the rotor paddles during the preparation of the dough. In the case of alimentary doughs for bread or confectionery products, the ingredients in a solid form also comprise yeast.

During the mixing step, the container is usually sealed by a lid and ingredients in a liquid form, e.g. water, necessary to prepare the desired dough are gradually added to the ingredients in a solid form. The mixing step lasts until a homogeneous dough suitable to be further processed is obtained.

It is known that an alimentary dough plays a very important role because its physical, chemical and structural properties determine the quality of a finished product obtained therefrom. The subsequent processing steps in fact may only optimize the finished product in relation to the initial properties of the dough, but it is not possible to improve the properties of the initial dough, nor to correct any limits and imperfections e.g. due to a poor quality of its ingredients or to a preparation mode that is not correct.

It is also known that the formation of an alimentary dough starts with the addition of water to a mixture of flour and/or meals. Water may be added either directly or indirectly as part of liquid ingredients such as eggs. In order to obtain an optimal hydration of the dough, ideally every single particle of the mixture of flour and/or meals should be wetted so as to receive an amount of water proportional to its mass.

The hydration of the particles of the mixture of flour and/or meals triggers a series of chemical and physical processes leading to the formation of gluten. During mixing and kneading, the molecules of gluten form a series of chemical bonds that make the alimentary dough more and more compact and elastic.

It is known that compactness and elasticity of an alimentary dough are highly influenced by the hydration level of the particles of mixtures of flour and/or meals. In order to promote the hydration of the particles of mixtures of flour and/or meals it is used to inject the liquid ingredients into the container in the form of sprays.

Patent GB 190826 discloses for example a kneader comprising a container inside which a rotor having an horizontal axis and provided with a plurality of mixing arms is rotatably arranged. The kneader also comprises a reservoir suitable to contain water, oil or other liquid ingredients. Mixtures of flours and/or meals necessary to make a dough are introduced into the container through a supply duct equipped with a vibrating device and ending with an aperture formed in a lid of the kneader. Therefore, the mixtures of flours and/or meals enter the container by gravity in a finely divided form as a result of the vibrations produced by the vibrating device. Since nozzles are arranged in the lid of the kneader, the particles of the mixtures of flours and/or meals come into close contact with the liquid ingredients injected by the nozzles before reaching the bottom of the container and being mixed by the rotor, thus allowing to obtain an adequate hydration level. Thanks to these features, the kneader allows to reduce the mixing time of doughs.

The Italian patent application MI2009A001318, in the applicant's name, discloses a kneader for alimentary doughs, comprising a container provided with a tight lid, inside which a rotor having a vertical axis and provided with a plurality of mixing paddles is arranged. The kneader also comprises a plurality of nozzles restrained to the lid and suitable to the inject ingredients necessary to make an alimentary dough, such as water and eggs, into the container in the form of a spray. The vertical axis rotor is configured so as to generate a raising effect of the flour from the bottom of the container towards the lid, thus promoting the contact between the flour and the spray-injected ingredients, whereby it is possible to obtain very homogeneous and elastic doughs in mixing in times shorter than those achievable by the kneaders known in the art.

The homogeneity and compactness of the alimentary doughs are of fundamental importance not only in the field of pasta, but also in the field of bread and confectionery products, there being more and more felt the need to reduce mixing times in order to limit undesired overheating phenomena that generally trigger leavening.

SUMMARY OF THE INVENTION

Despite the numerous types of kneaders known in the art, there still exists a need to improve the characteristics of homogeneity and elasticity of an alimentary dough and to further reduce their mixing times, while ensuring the achievement of high organoleptic characteristics, which is an object of the present invention.

An idea of solution underlying the present invention is to make an alimentary dough by mixing the mixtures of flours and/or meals with the necessary ingredients in countercurrent, thus promoting the close contact among them for the benefit of the homogeneousness and the elasticity of the dough. To this end, the rotor has a vertical rotation axis and comprises bevelled surfaces configured so as to generate a raising effect of the mixtures of flours and/or meals from the bottom of the container towards the lid tightly sealing it during its rotation. The kneader comprises a plurality of spray nozzles restrained to the lid and so arranged to direct their sprays towards the bottom and the walls of the container. The solid ingredients are thus mixed with the liquid ingredients both in a traditional way, on a generic plane parallel to the bottom of the container due to the whirling motion generated by the rotation of the rotor around its axis, and in countercurrent, on a generic plane perpendicular to the bottom of the container and passing through the rotation axis of the rotor due to its raising effect.

It is also an idea of solution to generate inside the container a mixing motion of the particles of the solid ingredients of a whirling type not only on a generic plane parallel to the bottom of the container, but also on a generic plane passing through the rotation axis of the rotor and perpendicular to its base.

For this purpose, the rotor comprises first and second mixing paddles that are inclined both relative to the flat base of the rotor radially outwards and to a plane passing through its rotation axis and perpendicular to its base. The free ends of the first mixing paddles are bent towards the rotation axis of the rotor, whereas the free ends of the second mixing paddles are bent away from the rotation axis of the rotor. Each arm of the rotor comprises at least a pair of paddles consisting of a first and a second mixing paddle, wherein the distance between the second mixing paddle and the rotation axis of the rotor is smaller than the distance between the first mixing paddle and the rotation axis of the rotor. The first and second mixing paddles of each pair are inclined in opposite directions relative to a plane perpendicular to the rotor base and passing through its rotation axis, so that a paddle precedes the other one during rotation of the rotor. Therefore, the particles of the solid ingredients raised by the rotor also circulate between the first and the second paddle of each pair of mixing paddles, and then cyclically fall onto the bottom of the container. This whirling motion allows to homogenize the particle size of the solid ingredients and to maximize their hydration level.

The main advantage offered by the invention is to allow preparation of alimentary doughs that are much more homogeneous and elastic than the alimentary doughs that characterize the kneaders known in the art, and have a very high level of hydration, the mixing between the mixtures of flours and/or meals and the liquid ingredients occurring by way of whirling motions simultaneously on multiple planes perpendicular to each other.

This particular mixing mode also allows to remarkably reduce preparation times of alimentary doughs and thus to increase the productivity of the kneader on equal volume of the container, which is extremely advantageous in industrial pasta facilities.

The mixing mode by way of whirling motions on several planes that are mutually perpendicular also allows to limit overheating phenomena of the dough due to friction between the particles of the solid ingredients during its mixing, which is extremely important in the case of doughs for bread and confectionery products, for which the leavening of the dough begins at temperatures of about 23° C., thus practically at room temperature.

The rotor may further comprise a plurality of indentations formed in its base, which extend transversely thereto from the bevelled surfaces towards the opposite edges. These indentations interrupt the continuity of the bevelled surfaces, thus limiting the raising effect of the particles of the solid ingredients and promoting their contact with the first and second mixing paddles as well as the whirling motion.

BRIEF DESCRIPTION OF THE DRAWINGS

Further advantages and features of the kneader and the production method of alimentary doughs according to the present invention will become clear to those skilled in the art from the following detailed and non-limiting description of an embodiment thereof with reference to the accompanying drawings wherein.

DETAILED DESCRIPTION OF THE INVENTION

Figure 1:
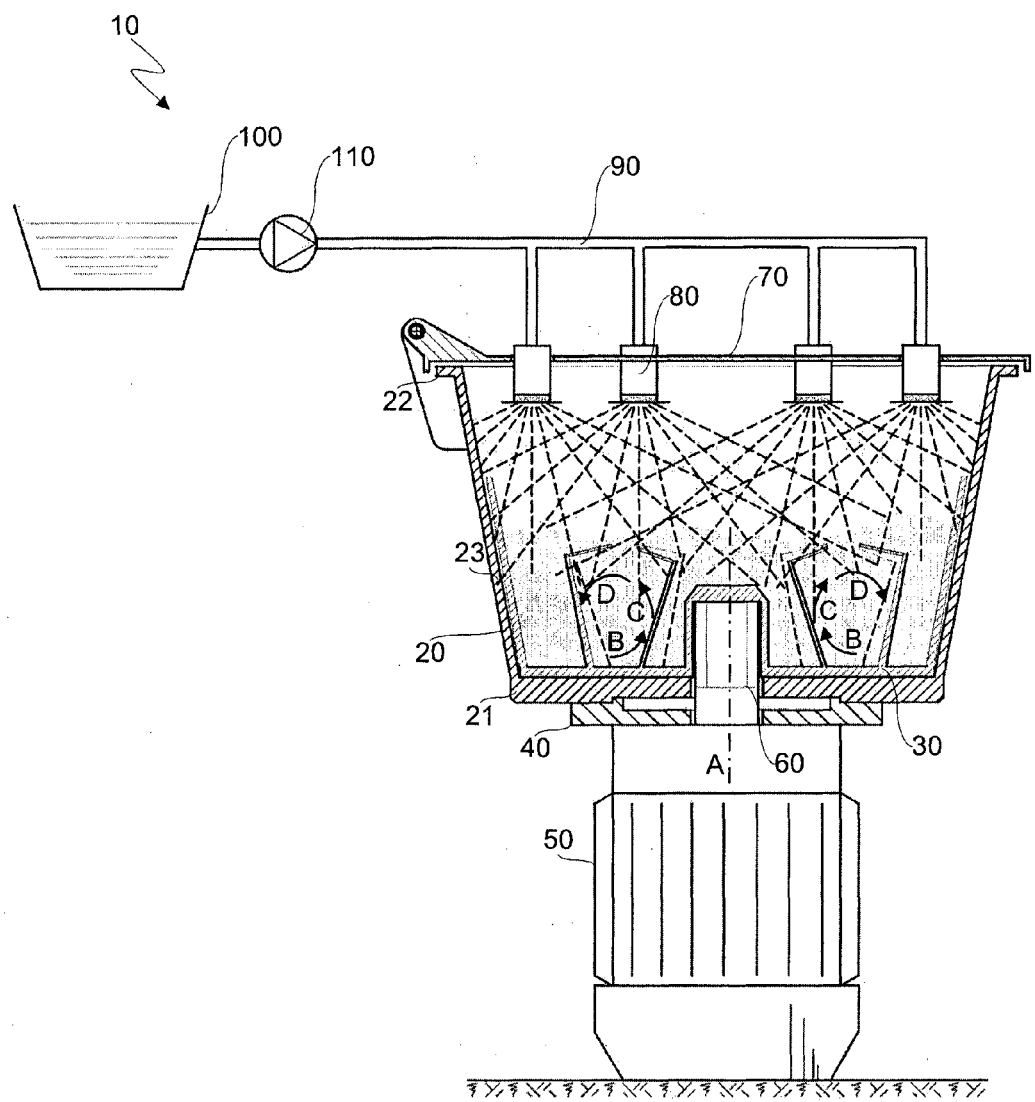
FIG. 1 is a longitudinal sectional view of a kneader machine according to the present invention.

Referring to FIG. 1, the kneader machine 10 according to the present invention comprises a container 20, for example made of stainless steel, inside which a rotor 30 provided with a plurality of mixing paddles is rotatably arranged. The container 20 comprises a bottom 21, an open top 22 adapted to allow pouring of ingredients in the solid state required for the preparation of a dough, such as mixtures of flour and/or meals and yeast. The container 20 also comprises side walls 23. In the illustrated embodiment the container 20 has in particular a frustoconical shape, which widens from the bottom 21 toward the open top 22.

The container 20 is connected, through a suitable supporting structure, such as e.g. a flange 40, to an electric motor 50. A shaft 60 of the electric motor 50 protrudes inside the container 20 and is rotatably coupled to the rotor 30 via a coupling, e.g. of a spline, polygonal joint or a similar coupling. The kneader 10 further includes a lid 70 adapted to tightly close the open top 22 of the container 20 during the preparation of an alimentary dough.

In an operating configuration of the kneader 10, the rotation axis A of the rotor 30 is substantially perpendicular to the bottom 21 of the container 20, as well as to a supporting surface of the kneader 10, and thus the rotor 30 has a substantially vertical rotation axis.

The rotor 30 comprises a flat base consisting of a plurality of arms extending radially outwards from a connecting portion 31 adapted to enable fitting of the rotor 30 on the shaft 60 of the electric motor 50. The rotor 30 also comprises a plurality of mixing paddles restrained to the arms that form its flat base; the mixing paddles extend in a vertical direction V that is substantially perpendicular to the base.

Figure 2:
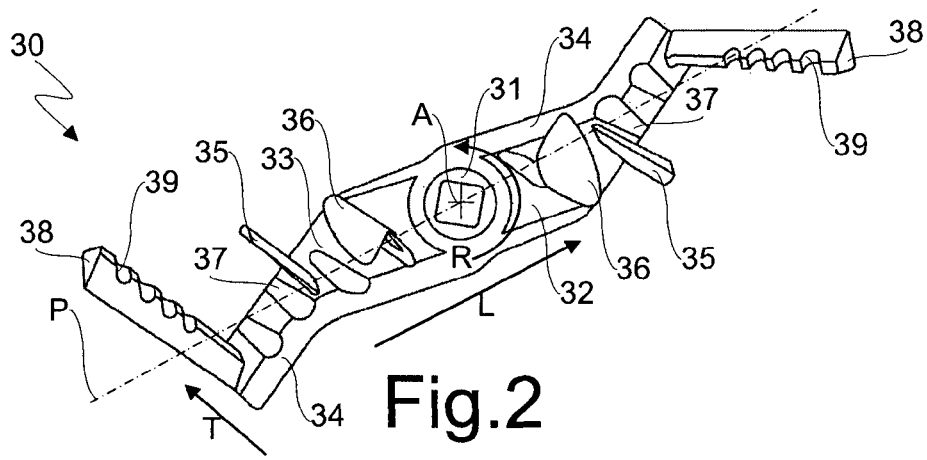
FIGS. 2, 3 and 4 show a top view, a front view and a perspective view of the rotor of the kneader of FIG. 1, respectively.
Figure 3:
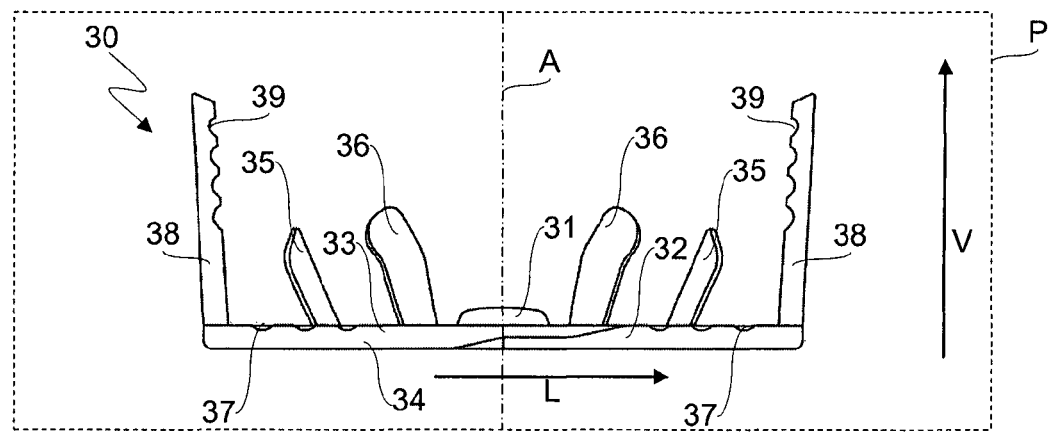
Figure 4:
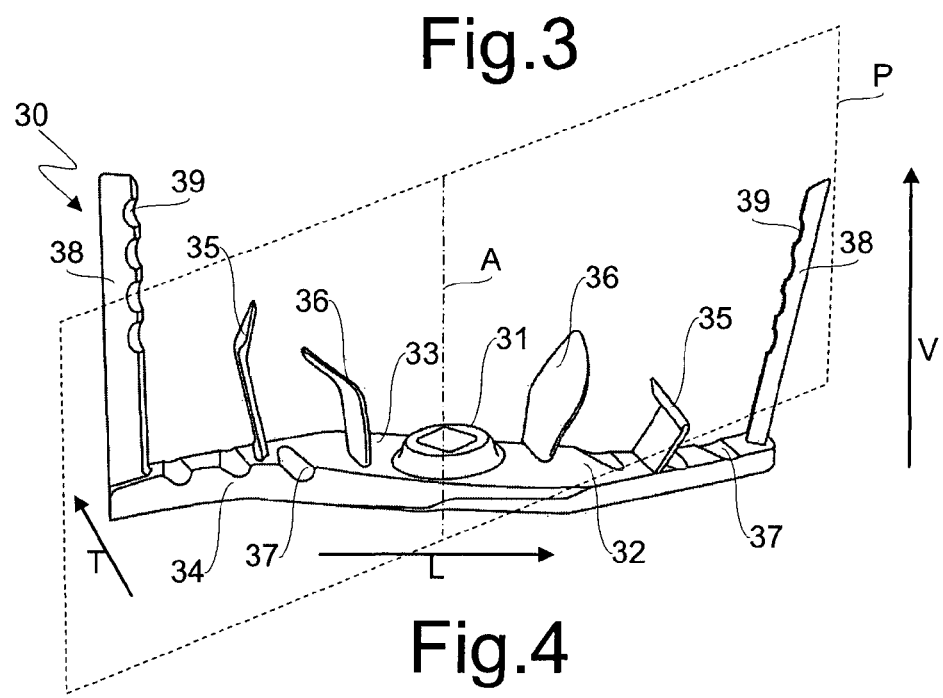

With particular reference to FIGS. 2 to 4, in the illustrated embodiment the flat base of the rotor 30 is formed in particular by two arms 32, 33 which extend from the connecting portion 31 in opposite directions in a longitudinal direction L, perpendicular to the vertical direction V.

As shown in detail in FIG. 2, the arms 32, 33 comprise bevelled surfaces 34 formed along their peripheries on the sides intended to face the rotation direction of the rotor 30, which is schematically shown in the figure by an arrow R. Thanks to this configuration, the rotation of the rotor 30 generates on the solid ingredients that are arranged in bulk in the container 20 a whirling motion generally parallel to the bottom 21 of the container 20, which urges the particles towards the side walls 23 due to centrifugal effect and at the same time raises them towards the top 22 finely dispersing them.

The kneader 10 further comprises a plurality of spray nozzles 80 suitable to inject the liquid ingredients necessary for the preparation of an alimentary dough in atomized form into the container 20, for example water.

The nozzles 80 are restrained to the lid 70 and arranged so as to direct the respective sprays towards the bottom 21 and the side walls 23 of the container 20, therefore towards the particles of the solid ingredients moved by the rotor 30. In FIG. 1 the sprays of the nozzles 80 are schematically shown by way of dashed lines.

The nozzles 80 are connected to at least one supply conduit that is in turn connected to at least one reservoir adapted to contain the liquid ingredients necessary for the preparation of the dough. The liquid ingredients are supplied by means of a supply pump.

In the embodiment shown in FIG. 1, the kneader 10 comprises in particular six spray nozzles 80 that are circumferentially arranged and connected to a single supply conduit 90; the supply conduit is in turn connected to a single container 100 downstream of which a supply pump 110 is arranged. In the longitudinal sectional view of FIG. 1 only four of the six nozzles 80 may be seen.

It is understood that the number of nozzles 80 and their arrangement with respect to the lid 70, as well as the number of supply ducts and reservoirs may vary depending on production needs. However, in view of the axisymmetric shape of the container 20, a axisymmetric arrangement of the nozzles 80, for example along a circumference coaxial to the rotation axis A, is preferable because it allows to distribute the sprays delivered by the nozzles in an extremely homogeneous and uniform way.

As described above, the nozzles 80 are arranged so as to direct their sprays towards the bottom 21 and the side walls 23 of the container 20. In this way, the particles of the solid ingredients raised from the rotor 30 towards the top 22 of container 20 meet the liquid ingredients injected in a spray form by the nozzles 80 in countercurrent, thus being intimately bound thereto and allowing to obtain mixtures that are extremely homogeneous and elastic.

According to the present invention, the rotor 30 is configured to generate a mixing movement of the ingredients present in the container 20 of a whirling type not only on a generic plane parallel to the bottom 21 of the container 20, but also on a generic plane perpendicular to the bottom 21 of the container 20 and passing through the rotation axis A of the rotor 30.

For this purpose, as shown in particular in FIGS. 2 to 4, the mixing paddles comprise first mixing paddles 35 that are inclined both relative to the flat base of the rotor 30 radially outwards, i.e. on the opposite side with respect to the rotation axis A of the rotor 30, and to a generic plane P passing through its rotation axis A and perpendicular to its base. As shown in particular in FIG. 4, the free ends of the first mixing paddles 35 are bent towards the rotation axis A of the rotor 30.

The mixing paddles further comprise second mixing paddles 36 that are inclined both relative to the flat base of the rotor 30 radially outwards and to the plane P passing through its rotation axis A and perpendicular to its base. Still with reference to FIG. 4, the free ends of the second mixing paddles 36 are bent away from the rotation axis A of the rotor 30.

Each arm of the rotor 30 comprises at least one pair of mixing paddles consisting of a first and a second mixing paddles 35, 36, wherein the distance between the second mixing paddle 36 and the rotation axis A of the rotor 30 is smaller than the distance between the first mixing paddle 35 and the rotation axis A of the rotor 30. In other words, starting from the axis A of rotation of the rotor 30 and following an arm of its base towards its free end a second mixing paddle 36 and a first mixing paddle 35 are arranged one after the other.

During the rotation of the rotor 30, this particular arrangement of the first and second mixing paddles 35, 36 causes the particles of the solid ingredients raised by the rotor 30 to be cyclically urged from one paddle to the other of each pair on the generic plane P passing through the rotation axis A of the rotor 30 and perpendicular to its base and then to fall towards the bottom 21 of the container 20, thus assuming a whirling motion that occurs proximate to the bottom of the container 20.

Moreover, for each pair of paddles the first and the second mixing paddles 35, 36 are inclined in opposite directions relative to the plane P perpendicular to the base of the rotor 30 and passing through its rotation axis A. This configuration ensures that for each pair of mixing paddles one paddle precedes the other in the rotation direction of the rotor 30, whereby the particles of the solid ingredients raised and urged from the paddles that precedes are collected from the paddle that follows and thereby directed towards the bottom 21 of the container 20.

In the illustrated embodiment, the second mixing paddles 36 precede the first mixing paddles 35 in the, rotation direction of the rotor 30, which is indicated by an arrow R. Therefore, the particles of the solid ingredients raised by the bevelled surfaces 34 are cyclically directed radially outwards from the second mixing paddles 36 and encounter the first mixing paddles 35 which direct them towards the bottom 21 of the container 20.

The whirling motion of the particles of the solid ingredients on the plane P, shown in FIG. 1 by means of a plurality of dots, is schematically illustrated by a series of arrows B, C, D.

It is understood that mixing between the particles of solid ingredients and the liquid ingredients injected in a spray form by the nozzles 80 occurs both during the raising movement of the particles of the solid ingredients towards the lid 70, and during the whirling movements generated by the mixing paddles.

In both cases mixing occurs in countercurrent thanks to the fact that the sprays delivered by the nozzles are widened towards the bottom 21 and the side walls 23 of the container 20.

It is also understood that the whirling motion of the particles of the solid ingredients with respect to the plane P is combined with their whirling motion on a generic plane parallel to the bottom 21 of the container 20, which is generated by the rotation of the rotor 30. Therefore, mixing takes place simultaneously on planes that are mutually perpendicular, thus allowing an extremely high degree of homogenization between the components of the alimentary dough. This also allows a very high level of hydration of the particles of the solid ingredients, in particular of the particles of flour and/or meals intended to form the gluten, which significantly improves the elastic properties of the dough, as well as its workability and preservation properties.

The whirling motion generated by the mixing paddles relative to the generic plane P also allows to generate a plurality of collisions among the particles of the solid ingredients, which are suitable to reduce their particle size and make it uniform during the early stages of the production process of the dough; this results in matrices of gluten that are extremely homogeneous and suitable to incorporate and retain particles of other ingredients, such as yeast, and therefore to make alimentary doughs that are remarkably compact and elastic.

In order to further facilitate the process of homogenization of the grain size of the particles of the solid ingredients, the rotor 30 may also advantageously comprise a plurality of indentations 37 formed in the arms 32, 33 of its base. The indentations 37 extend on each arm 32, 33 of the rotor 30 in a transverse direction T, perpendicular to the longitudinal direction L and to the vertical direction V, from the bevelled surfaces 34 toward the opposite edge.

The indentations 37 interrupt the continuity of the bevelled surfaces 34, reducing the raising effect of the particles of the solid ingredients during rotation of the rotor 30. The inventor has experimentally verified that this configuration allows to raise the particles of the solid ingredients substantially not beyond the mixing paddles 35, 36, which therefore generate with the maximum effectiveness the whirling movements that promote the homogenization of their particle size and hydration.

The mixing mode on planes perpendicular to each other made possible by the first and second mixing paddles 35, 36 allows to prepare alimentary doughs in very short times compared to those characterizing the kneaders known in the art.

For instance by means of a prototype of the kneader according to the invention the inventor has verified that it is possible to make 24 kg of an alimentary dough for bread with a flour type "00" in a time lower than 1 minute, which results in an hourly productivity of the kneader that can exceed 700 kg per hour also taking into account the loading time of the machine.

According to a further aspect of the invention, the rotor 30 further includes third mixing paddles 38 that are arranged at the free ends of the arms 32, 33 of the base of the rotor 30. The third mixing paddles 38 extend in the vertical direction V radially outwards and, similarly to the first and second mixing paddles 35, 36, are inclined both relative to the base of the rotor 30 and to the generic plane P passing through the rotation axis A of the rotor 30 and perpendicular to its base. The third paddles 38 are in particular inclined in opposite directions with respect to the base of the rotor 30 and to the plane P.

Unlike the first and second mixing paddles 35, 36 the free ends of which are bent, the third mixing paddles 38 are substantially straight and their function is to work the outer surface of the alimentary dough during its formation and to generate a winding effect thereon, which allows to shape it in the form of a single homogeneous and compact block that may be easily discharged from the container 20.

The third paddles 38 may advantageously comprise a plurality of indentations 39 formed in the transverse direction T. The indentations 39 formed on the third mixing paddles 38 allow to define gripping surfaces suitable to rotate the dough in particular during the final stage of its mixing process, when its mass has a substantially defined volume and it is necessary to create the winding effect described above which allows its compaction prior to discharging it.

The embodiment of the invention herein described and illustrated is only an example susceptible of numerous variants. For example, the number of arms that form the flat base of the rotor 30 can be greater than two, thus being able to configure different rotors depending on the size of the kneader and the hourly production needs. Consequently, it is possible to increase the number of pairs of first and second mixing paddles 35, 36 restrained to the arms 32, 33 of the rotor 30. Furthermore, the kneader 10 may comprise an automatic control system adapted to allow the control of the rotational speed of the rotor 30 and the operating parameters of the kneader, such as e.g. the injection pressure of the liquid ingredients, according to one or more programs stored in a control unit. It is also possible run refining programs for the solid ingredients in order to reduce the particle size of their particles before they are hydrated by injecting the liquid ingredients in a spray form.

The invention claimed is:

1. A kneader machine for alimentary doughs comprising a container provided with a tight lid and a rotor rotatably arranged in said container about a vertical rotation axis (A), wherein said rotor comprises a flat base consisting of a plurality of arms and a plurality of mixing paddles which extend from said arms in a vertical direction (V),
    wherein the arms of the rotor comprise beveled surfaces formed along their peripheries on the sides intended to face a rotation direction of rotation (R) of the rotor,
    wherein said mixing paddles comprise first mixing paddles and second mixing paddles that are inclined both relative to the flat base of the rotor radially outwards and to a generic plane (P) passing through its rotation axis (A) and perpendicular to its base, said first mixing paddles having free ends being bent towards the rotation axis (A) of the rotor and said second mixing paddles having free ends of being bent away from the rotation axis (A) of the rotor,
    wherein each arm of the rotor comprises at least one of said first mixing paddles and at least one of said second mixing paddles, wherein the distance between the at least one of said second mixing paddles and the rotation axis (A) of the rotor is smaller than the distance between the at least one of said first mixing paddles and the rotation axis (A) of the rotor, and
    wherein on each arm of the rotor the at least one of said first mixing paddles and the at least one of said second mixing paddles are inclined in opposite directions relative to said plane (P) perpendicular to the base of the rotor and passing through its rotation axis (A).

2. A kneader machine according to claim 1, wherein the rotor comprises a plurality of indentations formed in the arms, said indentations extending on each arm in a transverse direction (T) from a beveled surface thereof towards the opposite edge.

3. A kneader machine according to claim 1, further comprising third mixing paddles arranged at the free ends of the arms of the rotor, said third mixing paddles extending in the vertical direction (V) of the rotor radially outwards and being inclined in opposite directions relative to the base of the rotor and to the plane (P) perpendicular to the base of the rotor and passing through its rotation axis (A).

4. A kneader machine according to claim 3, wherein the third mixing paddles are substantially straight.

5. A kneader machine according to claim 3, wherein the third mixing paddles comprise a plurality of indentations formed in the transverse direction (T).

6. A kneader machine according to claim 1, further comprising an automatic control system adapted to allow the control of the rotation speed of the rotor and of the operating parameters of the kneader according to one or more programs stored in a control unit.

* * * * *